United States Patent [19]
Ngo et al.

[11] Patent Number: 6,111,716
[45] Date of Patent: Aug. 29, 2000

[54] REFERENCED MAGNETORESISTIVES SENSOR BAND PASS PREAMPLIFIER

[75] Inventors: Tuan V. Ngo, Eden Prairie; Craig M. Brannon, Maplewood; Douglas R. Peterson, Minnetonka, all of Minn.

[73] Assignee: VTC Inc., Bloomington, Minn.

[21] Appl. No.: 09/023,510

[22] Filed: Feb. 13, 1998

[51] Int. Cl.[7] .................................................. G11B 5/02

[52] U.S. Cl. ............................................................ 360/67

[58] Field of Search ........................ 360/46, 67; 330/261, 330/62

[56] References Cited

PUBLICATIONS

"Read/Write Amplifier Design Considerations for MR Heads" by Klassen et al., *1995 IEEE*.

*Primary Examiner*—W. Chris Kim
*Attorney, Agent, or Firm*—Kinney & Lange, P.A.

[57] ABSTRACT

A magnetoresistive sensor and preamplifier system for sensing magnetization patterns in a magnetic disk based digital data storage and retrieval memory with a grounded magnetoresistive sensor The signals from the magnetoresistive sensor are coupled by a coupling capacitor to a grounded differential amplifier. The structure of the coupling capacitor in a monolithic integrated circuit determines the passband for the system in passing the magnetoresistive sensor signals.

14 Claims, 1 Drawing Sheet

REFERENCED MAGNETORESISTIVES SENSOR BAND PASS PREAMPLIFIER

BACKGROUND OF THE INVENTION

The present invention relates to magnetic disk digital data storage and retrieval systems and, more particularly, to such systems in which a magnetoresistive sensor is used in the retrieval of magnetically stored digital data.

Magnetic disk digital data storage and retrieval systems are used to store data in a moving magnetic media layer provided on a moving disk through use of a storage, or "write" electrical current-to-magnetic field transducer, or "head" positioned immediately adjacent thereto. The data is stored or written to the magnetic media by switching the direction of flow of a substantially constant magnitude write current which is established in conductive windings in the write transducer. Each write current direction transition results in a reversal of the magnetization direction in that portion of the magnetic media just passing by the transducer during the flow established in the new direction with respect to the magnetization direction in the media induced by the previous flow in the opposite direction.

When such stored data is to be recovered, a retrieval, or "read" magnetic field-to-voltage transducer, or "head", is positioned to have the magnetic media, containing this previously stored digital data, pass closely thereby such that flux reversal regions in that media create a time varying magnetic field which can be sensed to provide a corresponding output signal. One kind of sensor for that purpose is a magnetoresistive sensor, a sensor that is provided in an operating circuit so that such flux reversal magnetic field regions result in correspondingly changing a circuit parameter to provide voltage pulses for forming an output signal for this retrieval transducer.

Such magnetoresistive sensors can often be advantageously fabricated using ferromagnetic thin-film materials. These sensor devices so formed may be provided on a surface of a monolithic integrated circuit chip in some instances to make convenient the provision of electrical connections between the device and some or all of the operating circuitry therefor provided in the integrated circuit chip which chip is then mounted on a positioning arm. In other instances, such sensors are independently mounted on such a positioning arm to be positioned conveniently close to the moving magnetic material for retrieval, and an interconnection lead is provided between the sensor, or the sensor and some integrated circuitry, and the rest of the operating circuit formed in a monolithic integrated circuit chip.

Such a sensor mounted on such an arm in an operating circuit is typically desired to have one end thereof connected to an electrical voltage potential which is the same as that electrical voltage potential at which the moving magnetic media is operated, typically the circuitry ground, to prevent the occurrence of electrical discharge "arcing" between the sensor and the media over the very small distance therebetween. Another effect of the magnetoresistive sensor on the operating circuit in which it is provided is the addition of a significant electrical resistance in that circuit due to the sensor because such sensors must be made quite small so as to have dimensions on the order of the area taken up by digital data bit magnetization areas in the moving magnetic media. A further characteristic of such magnetoresistive sensors in the past has been the substantial variation in resistance from sensor to sensor as a result of the fabrication process therefor. In such circumstances, there was a desire to have the output signal from the operating circuitry for the magnetoresistive sensor represent the quantity $\rightarrow$R/R, where $\rightarrow$R is the signal change and R is the nominal sensor resistance, rather than just $\rightarrow$R to provide some normalization in the output signal to counter such variations in the value of R resulting from the fabrication process.

These circuit desires have led in the past to the use of operating circuits which depend on circuit signal feedback loops to provide the desired operating circuit characteristics. However, the frequency content of signals to be sensed by a magnetoresistive sensor in a magnetic disk digital data storage and retrieval system can range from 20MHz to 200MHz or more. Over such a large frequency range, the use of feedback loop circuits raises questions of whether stability can be maintained in the circuit over this range in view of changing circuit parameters due to fabrication process variations and changing environmental conditions. Thus, there is a desire to avoid such stability problems in the operating circuitry for such magnetoresistive sensors while still providing substantial gain therefor and low noise operation therewith.

BRIEF SUMMARY OF THE INVENTION

The present invention provides a magnetoresistive sensor and preamplifier system for sensing magnetization patterns in a magnetic disk based digital data storage and retrieval memory with a grounded magnetoresistive sensor. An operating current generator is provided by a current source in series with a resistor and connected to a follower transistor control region with the follower transistor second terminating region being electrically connected to the magnetoresistive sensor. A differential amplifier has a pair of inputs and is electrically connected to a current sink to draw the quiescent current therethrough with a coupling capacitor being electrically connected between one of the pair of differential amplifier inputs and the magnetoresistive sensor. A shunting capacitor is electrically connected between said remaining one of the differential amplifier inputs and ground.

The differential amplifier and the coupling capacitor are formed as structures in a monolithic integrated circuit where the coupling capacitor structure results in circuit parameters affecting values of both a lower break frequency and a higher break frequency of a frequency passband for signals generated by the magnetoresistive sensor as determined at the amplifier output. The differential amplifier can be a cascode configuration differential amplifier.

DETAILED DESCRIPTION OF THE PREFERRED EMBODIMENTS

Figure 1:
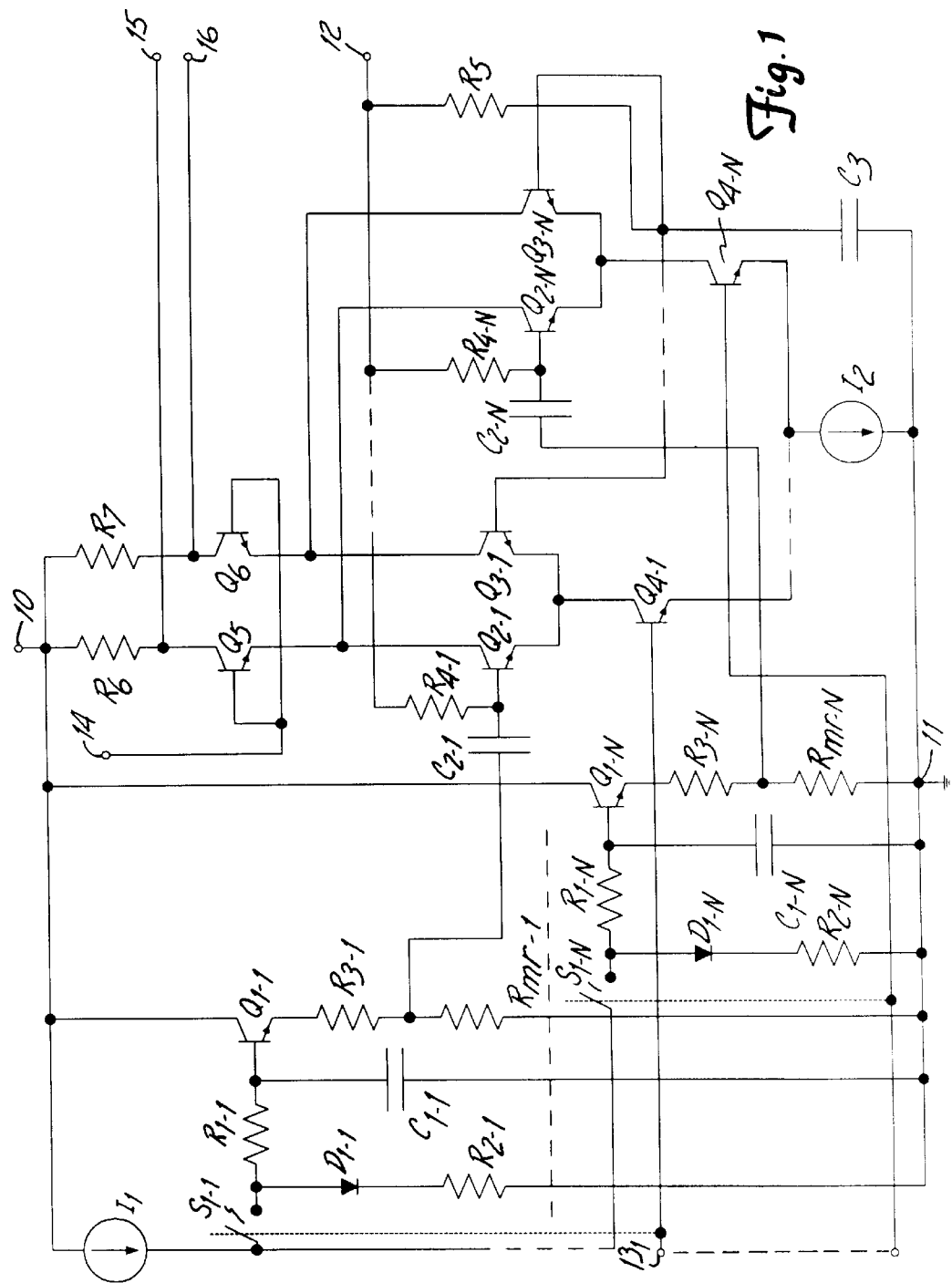
FIG. 1 is an electrical schematic diagram of an electrical circuit arrangement embodying the present invention.

FIG. 1 shows an electrical circuit schematic diagram of a magnetoresistive sensor and preamplifier system permitting the selection of alternative magnetoresistive sensors to generate sensor output signals for amplification by the system in providing a system output data retrieval or "read" signal. Typically, each of these magnetoresistive sensors is mounted on a different positioning arm provided adjacent a different magnetic media surface from among, which the retrieval system will make a selection as the basis for retrieving that digital data being sought. The description in the following will describe the circuit arrangement and then describe the operation and parameters for the circuit portion containing the first magnetoresistive sensor and associated circuitry, but the similarity between the circuit portion for the first magnetoresistive sensor and the portions for the remaining ones of such sensors will result in effectively having described the circuitry associated with each such sensor for the most part.

In practice, most of the circuitry shown in FIG. 1 will be provided in and on a monolithic integrated circuit chip with the possible exception of the magnetoresistive sensors themselves which may be alternatively formed on a separate substrate that is possibly another integrated circuit chip, but perhaps some other kind of substrate, mounted on positioning arms independently and connected to terminal arrangements, or pads, on an associated signal processing chip. The switching signals for operating the switches that are shown in the FIG. 1 diagram for simplicity and clarity as single pole, single throw mechanical switches are instead transistor based switches in the actual monolithic integrated circuit chip, and the control signals for such switches are provided from a system control and operation microprocessor not shown.

The first magnetoresistive sensor in the plurality thereof indicated in the diagram of FIG. 1 is designated by its nominal resistance value symbol $R_{mr-1}$, and the last magnetoresistive sensor in this plurality of N such $R_{mr}$ sensors is similarly designated $R_{mr-N}$, with the symbol following the dash in the subscript indicating which of the sensors in the plurality of such $R_{mr}$ sensors is being designated. The remaining N-2 magnetoresistive sensors, if additional ones are selected to actually present in the system are not shown in FIG. 1. The circuit of FIG. 1 is operated across a voltage source not shown in that figure and has a terminal means, 10, therein suited for electrical connection to a positive voltage terminal of such a voltage source so as to be maintained at a positive voltage potential with respect to that voltage potential occurring on a reference terminal of the voltage source. The circuit of FIG. 1 also has a ground reference terminal means, 11, suited for connection to that reference terminal of the voltage source. Each of the magnetoresistors $R_{mr-1}$ through $R_{mr-N}$ in the plurality of N such sensors has one side thereof connected to ground reference terminal means 11.

A current source, again designated by its circuit current supply value symbol $I_1$, has a current draw side thereof connected to terminal 10, and a current supply side thereof connected to one side of each of a group of single pole, single throw switches $S_{1-1}$ through $S_{1-N}$ in a plurality of N such $S_1$ switches. The remaining N-2 such switches to which current source $I_1$ is connected, if additional ones are chosen to be actually present in the system in correspondence with the possible providing additional sensors as indicated above, are not shown in FIG. 1, but are indicated by a dashed line in the current source $I_1$ interconnection portion between switches $S_{1-1}$ and $S_{1-N}$.

The other side of switch $S_{1-1}$ is connected to the anode of one of a plurality of N diodes, $D_{1-1}$, and to one side of a corresponding resistor, $R_{1-1}$, which is one of a plurality of N of such $R_1$ resistors. The opposite side of switch $S_{1-N}$ is connected to the anode of a diode $D_{1-N}$ in the plurality of such $D_1$ diodes and to one side of a corresponding resistor, $R_{1-N}$, in the plurality of such $R_1$ resistors. The remaining N-2 such diodes to which further corresponding switches are connected, if additional ones are chosen to be actually present in the system in correspondence with providing additional sensors and switches as indicated above, are not shown in FIG. 1. The cathode of diode $D_{1-1}$ is connected to one side of a corresponding resistor, $R_{2-1}$, in a plurality of N such resistors and the cathode of diode $D_{1-N}$ is connected to one side of a corresponding resistor, $R_{2-N}$, in that plurality.

Any other $D_1$ diodes present in the plurality thereof are similarly connected at their cathodes to one side of corresponding other resistors in the plurality of $R_2$ resistors not shown. The other sides of resistors $R_{2-1}$ and $R_{2-N}$, and any other $R_2$ resistors not shown that are similarly connected to further ones in the plurality of diodes, are each connected to ground reference terminal 11.

The side of resistor $R_{1-1}$, not connected to switch $S_{1-1}$ is connected both to the base of an npn bipolar transistor, $Q_{1-1}$, in a plurality of N such $Q_1$ transistors, and to one side of a filtering capacitor, $C_{1-1}$, in a plurality of N such $C_1$ filtering capacitors. Similarly, the side of resistor $R_{1-N}$ not connected to switch $S_{1-N}$ is connected both to the base of another npn bipolar transistor, $Q_{1-N}$, in the plurality thereof, and to one side of another filtering capacitor, $C_{1-N}$, in the plurality thereof The opposite sides of filtering capacitors $C_{1-1}$ and $C_{1-N}$, and of any other $C_1$ filtering capacitors in the plurality thereof not shown that are similarly connected to further ones in the plurality of $S_1$ switches, if any, are each connected to ground reference terminal 11.

Transistor $Q_{1-1}$ has its collector connected to positive voltage terminal 10 and its emitter connected to one side of a corresponding resistor, $R_{3-1}$, in a plurality of N of such $R_3$ resistors. The opposite side of resistor $R_{3-1}$ is connected to the side of corresponding magnetoresistive sensor $R_{mr-1}$ not connected to ground reference terminal 11, and to one side of a coupling capacitor, $C_{2-1}$, in a plurality of N such $C_2$ coupling capacitors.

Similarly, the collector of transistor $Q_{1-N}$ is connected to positive voltage terminal 10, and the emitter thereof is connected to one side of a corresponding resistor, $R_{3-N}$, in the plurality of $R_3$ resistors. The other side of resistor $R_{3-N}$ is connected to the side of corresponding magnetoresistive sensor $R_{mr-N}$ not connected to ground reference terminal 11, and is further connected to a coupling capacitor, $C_{2-N}$, in the plurality of $C_2$ coupling capacitors. Any other $Q_1$ transistors in the plurality thereof not shown that are each similarly connected at its base through corresponding other ones of the plurality of $R_1$ resistors to further ones in the plurality of $S_1$ switches, if any, also has its collector connected to terminal 10 and its emitter connected through a corresponding one of the plurality of $R_3$ resistors to a corresponding one of the plurality of $R_{mr}$ magnetoresistive sensors.

Switch $S_{1-1}$, diode $D_{1-1}$, transistor $Q_{1-1}$, resistors $R_{1-1}$, $R_{2-1}$ and $R_{3-1}$, along with capacitors $C_{1-1}$ and $C_{2-1}$ form a biasing, filtering and coupling circuit for magnetoresistive sensor $R_{mr-1}$. Similarly, switch $S_{1-N}$, diode $D_{1-N}$, transistor $Q_{1-N}$, resistors $R_{1-N}$, $R_{2-N}$ and $R_{3-N}$, along with capacitors $C_{1-N}$ and $C_{2-N}$ form a biasing, filtering and coupling circuit for magnetoresistive sensor $R_{mr-N}$. Further such biasing, filtering and coupling circuits are provided for each of the other $R_{mr}$ magnetoresistive sensors not shown, if any, with the possibility of additional such circuits being included in the circuit of FIG. 1 shown by the horizontal dashed line drawn between resistor $R_{2-1}$, and switch $S_{1-N}$.

Each of these N magnetoresistive sensor biasing, filtering and coupling circuits are connected through the coupling capacitor therein to one side of a corresponding differential amplifier in a plurality of N such amplifiers but with each of these corresponding differential amplifiers sharing a common load circuit and a common bias current sink. Thus, coupling capacitor $C_{2-1}$ is connected to the base of a npn bipolar transistor, $Q_{2-1}$, in a plurality of N of $Q_2$ transistors which has its emitter coupled to the emitter of another npn bipolar transistor, $Q_{3-1}$, in a plurality of N of $Q_3$ transistors to form the emitter coupled input transistor pair for the differential amplifier corresponding to the biasing, filtering and coupling circuit associated with magnetoresistive sensor $R_{mr-1}$Coupling capacitor $C_{2-1}$, is also connected to one side of a biasing resistor, $R_{4-1}$, in a plurality of N of $R_4$ biasing resistors which has its other side connected to a first intermediate reference voltage terminal, 12.

The base of transistor $Q_{3-1}$ is connected to a further biasing resistor, $R_5$, commonly connected to an input transistor base in each of the differential amplifiers provided, and is further connected to a shunting capacitor, $C_3$, again commonly connected to the same input transistor base as is $R_5$ in each of the differential amplifiers. The opposite side of resistor $R_5$ is connected to first intermediate reference voltage terminal 12, and the opposite side of capacitor $C_3$ is connected to ground reference terminal 11.

The emitters of transistors $Q_{2-1}$, and $Q_{3-1}$, are connected to the collector of a selector switch transistor, $Q_{4-1}$, in a plurality of $Q_4$ selector switch transistors. The emitter of selector switch transistor $Q_{4-1}$ is connected to a current sink designated by its current sink value of $I_2$ which is the common current sink indicated above. The base of selector switch transistor $Q_{4-1}$ is connected to a switching control terminal, $13_1$, in a plurality of N of such switching control terminals each corresponding to a selector switch transistor in the plurality of $Q_4$ selector switch transistors. Voltage logic signals provided at terminal $13_1$ are capable of placing selector switch transistor $Q_{4-1}$ in either the "on" condition or in the "off" condition so as to control whether current is allowed to be drawn from the emitters of transistors $Q_{2-1}$ and $Q_{3-1}$, by current sink $I_2$. Such logic signals at terminal $13_1$ also control whether switch $S_{1-1}$ is in an opened or closed state as is indicated by a dashed line extending therebetween.

The collector of differential amplifier input transistor $Q_{2-1}$ is connected to the emitter of a cascode npn bipolar transistor, $Q_5$. The collector of cascode transistor $Q_5$ is connected to one side of a load resistor, $R_6$, having its other side connected to positive voltage terminal 10. In a similar manner, the collector of transistor $Q_{3-1}$, is connected to the emitter of a further cascode npn bipolar transistor, $Q_6$. The collector of transistor $Q_6$ is connected to one side of a load resistor, $R_7$, having its other side connected to positive voltage terminal 10. The bases of each of transistors $Q_5$ and $Q_6$ are connected to a second intermediate reference voltage terminal, 14, suited for connection to a source of reference voltage. The amplifier signal outputs, 15 and 16, are connected to the collectors of cascode transistors $Q_5$ and $Q_6$. Transistors $Q_5$ and $Q_6$ together with resistors $R_6$ and $R_7$ provide the common load circuit for the N differential amplifier input transistor pairs indicated above.

Similarly, further pairs of transistors from the pluralities of $Q_2$ and $Q_3$ transistor so connected together at their emitters form the input transistor pairs of the N differential amplifiers each corresponding to a particular biasing, filtering and coupling circuit associated with another of the $R_{mr}$ magnetoresistive sensors. Thus, a similar circuit arrangement is provided for the differential amplifier responding to the biasing, filtering and coupling circuit for magnetoresistive sensor $R_{mr-N}$. Coupling capacitor $C_{2-N}$ is connected to the base of a npn bipolar transistor, $Q_{2-N}$, in the plurality thereof which has its emitter coupled to the emitter of another npn bipolar transistor, $Q_{3-N}$, in the plurality thereof to form the emitter coupled input transistor pair for the differential amplifier corresponding to the biasing, filtering and coupling circuit associated with magnetoresistive sensor $R_{mr-N}$. Coupling capacitor $C_{2-N}$, is also connected to one side of a biasing resistor, $R_{4-N}$, in the plurality thereof which has its other side connected to first intermediate reference voltage terminal 12. The base of transistor $Q_{3-N}$ is connected to $R_5$ and is further connected to shunting capacitor $C_3$.

The emitters of transistors $Q_{2-N}$ and $Q_{3-N}$ are connected to the collector of a selector switch transistor, $Q_{4-N}$, in the plurality thereof. The emitter of selector switch transistor $Q_{4-N}$ is connected to current sink $I_2$. The base of selector switch transistor $Q_{4-N}$ is connected to a switching control terminal, $13_N$, in the plurality thereof. Voltage logic signals provided at terminal $13_N$ are again capable of placing selector switch transistor $Q_{4-N}$ in either the "on" condition or in the "off" condition so as to control whether current is allowed to be drawn from the emitters of transistors $Q_{2-N}$ and $Q_{3-N}$ by current sink $I_2$. Such logic signals at terminal $13_1$ also control whether switch $S_{1-N}$ is in an opened or closed state as is indicated by a dashed line extending therebetween.

The collector of differential amplifier input transistor $Q_{2-N}$ is connected to the emitter of cascode npn bipolar transistor $Q_5$ in the common load circuit. In a similar manner, the collector of input transistor $Q_{3-N}$ is connected to the emitter of cascode npn bipolar transistor $Q_6$ in the common load circuit.

The remaining N-2 such differential amplifier input transistor pairs to which further corresponding coupling capacitors are connected, if additional ones are chosen to be actually present in the system in correspondence with providing additional sensors and corresponding biasing, filtering and coupling circuits as indicated above, are not shown in FIG. 1. However, further such differential amplifier input transistor pairs and corresponding coupling capacitors are provided connected to the biasing, filtering and coupling circuits for each of the other $R_{mr}$ magnetoresistive sensors not shown, if any, with the possibility of additional such circuits being included in the circuit of FIG. 1 shown by the horizontal dashed lines present in the interconnections between the $R_4$ resistors, between $R_5$ and the $Q_3$ transistors, and between the $Q_4$ transistors. As before, further pairs of transistors from the pluralities of $Q_2$ and $Q_3$ transistor so connected together at their emitters form the input transistor pairs of the N differential amplifiers each corresponding to a particular biasing, filtering and coupling circuit associated with another of the $R_{mr}$ magnetoresistive sensors.

Utilizing the sensing capability of magnetoresistive sensor $R_{mr-1}$ to obtain magnetization information from a moving magnetic media disk positioned closely adjacent thereto requires logic signals to be provided on control terminal $13_1$ both to close switch $S_{1-1}$ and to switch transistor $Q_{4-1}$ into the "on" condition. The first of these switchings allow current supplied from current source $I_1$ to result in a current in diode $D_{1-1}$, through resistor $R_{2-1}$ to ground reference terminal 11 to establish a voltage across these components, and a current in resistor $R_{1-1}$ into the base of transistor $Q_{1-1}$ to switch that transistor into the "on" condition as well as to charge capacitor $C_{1-1}$ to the voltage established across diode $D_{1-1}$ and resistor $R_{2-1}$.

The second of the switchings, in switching transistor $Q_{4-1}$ into the "on" condition, allows current sink $I_2$ to draw a current through differential amplifier input transistors $Q_{2-1}$ and $Q_{3-1}$ as these two transistors are placed in the "on" condition by the base current supplied to transistor $Q_{2-1}$ through bias resistor $R_{4-1}$ and the base current supplied to transistor $Q_{3-1}$ through bias resistor $R_5$. Resistors $R_{4-1}$ and $R_5$ are closely matched in structure and closely positioned to one another in the monolithic integrated circuit chip so as to exhibit characteristics very similar to one another which results in very similar base currents being supplied to the differential amplifier input transistors $Q_{2-1}$ and $Q_{3-1}$ if these transistors have similar base-emitter characteristics. These two transistors are also closely matched in structure to one another and closely positioned to one another in the monolithic integrated circuit chip so again to exhibit characteristics very similar to one another which results in very similar quiescent base currents being supplied to these transistors which establish very similar quiescent collector currents therein in response. The close matching of bias resistors $R_{4-1}$ and $R_5$, and of input transistors $Q_{2-1}$ and $Q_{3-1}$, results in any disturbances occurring in the reference voltage at terminal 12 affecting the collector currents in the transistors as common-mode signals without giving rise to differences therebetween that might appear as an unwanted differential signal at outputs 15 and 16.

Current sink $I_2$, drawing current through the emitters of differential amplifier input transistors $Q_{2-1}$ and $Q_{3-1}$, by drawing a collector current through transistor $Q_{4-1}$, will result in corresponding collector currents being drawn by these transistors from the emitters of transistors $Q_5$ and $Q_6$ since transistors $Q_5$ and $Q_6$ are placed in the "on" condition in this circumstance by having the bases thereof connected to second intermediate reference voltage terminal 14. Similarly, in turn, currents drawn through the emitters of transistors $Q_5$ and $Q_6$ will result in currents being drawn through the corresponding one of resistors $R_6$ and $R_7$ from positive voltage terminal 10.

Transistor $Q_{2-1}$ and transistor $Q_5$ form a cascode amplifier configuration with transistor $Q_{2-1}$ serving as a common-emitter input stage followed by transistor $Q_5$ serving as a common-base output stage. Transistors $Q_{3-1}$, and $Q_6$ form a similar amplifier configuration. Transistors $Q_5$ and $Q_6$ are closely matched to one another and positioned close to one another in the monolithic integrated circuit to have similar characteristics, and resistors $R_6$ and $R_7$ are also closely matched and closely positioned to one another in the monolithic integrated circuit chip to have similar characteristics, again to avoid having differences in characteristics result in differential output signals even though the quiescent collector currents of the input transistor pairs in the differential amplifiers are very similar to one another.

Following these switchings of switch $S_{1-1}$ and transistor $Q_{4-1}$, the current supplied by current source $I_1$ will flow primarily through diode $D_{1-1}$ and resistor $R_{2-1}$ to ground terminal 11 because of the action of transistor $Q_{1-1}$ and the resistance load in its emitter circuit The first of these emitter circuit load resistances is that of magnetoresistive sensor $R_{mr-1}$ in parallel with input impedance of the differential amplifier in series with coupling capacitor $C_{2-1}$. A typical resistance value for magnetoresistive sensor $R_{mr-1}$ is 30Ω. The much higher input resistance of the differential amplifier that is effective at the base of input transistor $Q_{2-1}$, even in the presence of base bias resistor $R_{4-1}$, results in this first emitter circuit load resistance being essentially that of magnetoresistive sensor, at least at sufficiently low signal frequencies.

The direct biasing current supplied to magnetoresistive sensor $R_{mr-1}$ by transistor $Q_{1-1}$ land resistor $R_{3-1}$, the second resistance in the emitter circuit of transistor $Q_{1-1}$, should appear to be supplied from a current source so that the resistive variations of magnetoresistive sensor $R_{mr-1}$ due to the adjacent magnetic media moving thereby have little effect on the magnitude of that current. If so, nearly the full voltage signal developed thereacross resulting from these resistive variations will be available at the input of the differential amplifier input transistor $Q_{2-1}$ base. Since the effective resistance at emitter of $Q_{1-1}$ in such an emitter-follower amplifier stage is relatively low, the ability of the combination of transistor $Q_{1-1}$ and resistor $R_{3-1}$ to appear as a current source to magnetoresistive sensor $R_{mr-1}$ depends primarily on the magnitude of the resistance of resistor $R_{3-1}$.

A magnitude for the current to be provided in magnetoresistive sensor $R_{mr-1}$, is selected that will result in a sufficiently large output voltage signal therefrom for the corresponding resistance changes expected due to the magnetic field changes provided by the moving magnetic media. Once this selection is made, the largest value of resistance possible is chosen for the magnitude of the resistance of resistor $R_{3-1}$ subject to the limit imposed by the magnitude of the voltage available at positive voltage terminal 10. Typically, resistor $R_{3-1}$ will have a resistance value of at least five or six times that of magnetoresistive sensor $R_{mr-1}$ to allow transistor $Q_{1-1}$ and resistor $R_{3-1}$ to behave as a magnetoresistive sensor bias current generator having characteristics that appear sufficiently like those of a current source in supplying bias current to the sensor.

As a result, the sum of the resistances of resistor $R_{3-1}$ and magnetoresistive sensor $R_{mr-1}$ as "reflected" at the base of transistor $Q_{1-1}$ where they appear effectively multiplied by the gain of that transistor, leads to a resistance there that, when summed with the resistance value of resistor $R_{1-1}$, results in an effective resistance magnitude which is several times the magnitude of resistor $R_{2-1}$. Thus, as stated above, most of the current from current source $I_1$ will flow through diode $D_{1-1}$ and resistor $R_2$.

The result is that a voltage is established across these components that serves at the anode of diode $D_{1-1}$ as a reference value for the base of transistor $Q_{1-1}$ and so for the emitter of that transistor which is at a voltage less than this reference by the base-emitter diode voltage drop. Once capacitor $C_{1-1}$ has charged to the reference voltage at the base of transistor $Q_{1-1}$ after the closing of switching $S_{1-1}$, only the very small base current for transistor $Q_{1-1}$ will flow in resistor $R_{1-1}$ leaving the base of that transistor essentially at the voltage which occurs at the anode of diode $D_{1-1}$. This voltage reference for the emitter of transistor $Q_{1-1}$ is stabilized over temperature changes by the close matching in structure and the close positioning in the monolithic integrated circuit chip of transistor $Q_{1-1}$ and diode $D_{1-1}$ so that their characteristics track one another over temperature. Typically, diode $D_{1-1}$ is formed as a transistor with the structure of transistor $Q_{1-1}$ but having its base connected to its collector.

Resistor $R_{1-1}$ and capacitor $C_{1-1}$ together form a low pass filter which serves as a noise filter for noise transmitted from the voltage source connected to positive voltage terminal 10 and as generated in current source $I_1$. The break frequency of this noise filter is set at around 1.0 MHz which, as will be seen below, is at the lower break frequency for the passband of the coupling capacitor and amplifier transfer characteristic and below the signal frequency range for signals expected to be generated by magnetoresistive sensor $R_{mr-1}$.

Thus, signal voltages will be established at the junction of emitter resistor $R_{3-1}$ and magnetoresistive sensor R representing the resistance changes occurring in sensor $R_{mr-1}$ in response to changing magnetic fields thereabout due to magnetization changes in the moving magnetic media adjacent thereto in the magnetic disk digital data storage and retrieval system. However, the need for the resistance of magnetoresistive sensor $R_{mr-1}$ to be relatively low with respect to the resistance of resistor $R_{3-1}$, and the need for the sensor to have one side thereof connected to ground reference terminal 11 to avoid arcing between that sensor and the media surface, results in the quiescent voltage across sensor $R_{mr-1}$ being of a relatively small value, typically just a couple of tenths of a volt. Such a value is too small in magnitude to be at the necessary biasing voltage for the differential amplifier input transistor $Q_{2-1}$ if just a single power supply is to be used in the circuit which is typically desired. Thus, coupling capacitor $C_{2-1}$ is used to couple the signal developed at the junction of resistor $R_{3-1}$ and magnetoresistive sensor $R_{mr-1}$ to the base of differential amplifier input transistor $Q_{2-1}$.

The use of coupling capacitor $C_{2-1}$, at sufficiently low signal frequencies, limits the magnitude of signals from magnetoresistive sensor $R_{mr-1}$ which can be transmitted therethrough to the base of differential amplifier input transistor $Q_{2-1}$. As a result, the use of coupling capacitor $C_{2-1}$ results in a bandpass amplifier system for signals from magnetoresistive sensor $R_{mr-1}$ with the lower break frequency of the frequency transfer characteristic being set by the capacitance value of this capacitor and the resistance effectively occurring in series therewith. For a cascode differential amplifier configuration like that shown in FIG. 1 which receives an input signal at just one input thereof while the other differential input is effectively at signal ground (because of capacitor $C_3$), the effective resistance at the base of differential amplifier input transistor $Q_{2-1}$ turns out to be the base to emitter resistance, $r_\pi$, the base-emitter effective resistance occurring in the hybrid-$\pi$ model for bipolar transistors, given the resistance values chosen for resistors $R_{3-1}$ and $R_{4-1}$ along with the effective resistance of magnetoresistive sensor $R_{mr-1}$. As a result, the break frequency at the low end of the bandpass transfer characteristic of the amplifier, $f_1$, for signals generated by magnetoresistive sensor $R_{mr-1}$ is approximately $$f_1 = \frac{1}{2\pi C_{2-1} r_{\pi-Q_{2-1}}}.$$

This break frequency also sets the amplifier system low frequency noise characteristic since the capacitive impedance of the coupling capacitor increases with decreasing frequency, and its corresponding smaller shunting effect with decreasing frequency results in more of the input transistor $Q_{2-1}$ base current shot noise $\sqrt{2qI_B}$ being amplified, The value of the effective base-emitter resistance $r_\pi$ for a bipolar transistor is, as is well known, determined by the magnitude of collector current as set out by $$r_\pi = \frac{\beta V_T}{I_C},$$

where the common emitter current gain, $\beta$, is defined $\beta = I_c/I_B$ with $I_B$ being the transistor quiescent base current and $I_c$ being the corresponding transistor quiescent collector current, this gain typically having a value of 100 in the presence of a substantial collector current. $V_T$ is the base-emitter junction thermal voltage which is defined as $V_T = kT/q$ with k being Boltzmann's constant, T being the absolute temperature in degrees Kelvin, and q being the electronic charge magnitude, with the thermal voltage typically being about 25 mV at room temperature. Thus, the effective base-emitter resistance $r_\pi$ for a bipolar transistor varies inversely with the collector current magnitude in that transistor.

On the other hand, the dominant noise source in transistor $Q_{2-1}$ is the collector current shot noise which is known to equal $\sqrt{2qI_c}$. The output signal at the collector of a common-emitter connected bipolar transistor is proportional to the transconductance $g_m = I_c/V_T$ of that transistor. Because the transconductance $g_m$ increases proportionally to the collector current $I_c$ of the transistor, the effect is to have the signal-to-noise ratio through the transistor increase with the square root of the collector current therethrough or $$\sqrt{I_c}.$$

Thus, there is a temptation to increase the collector current flowing in the differential amplifier input transistors $Q_{2-1}$ and $Q_{3-1}$ to improve the signal-to-noise ratio. Doing so, however, will result in reducing the value of $r_\pi$ which will have the effect of shifting the lower corner frequency of the amplifier passband upward thus narrowing the bandwidth. Such a narrowing of the passband seemingly could be countered by increasing the capacitance value of coupling capacitor $C_{2-1}$, but this has detrimental consequences because such an increase in capacitance value for this capacitor must be achieved by increasing the area in the surface of the monolithic integrated circuit chip devoted to structure forming this capacitor.

Not only does such an increase in chip area devoted to the capacitor structure have adverse economic consequences for the monolithic integrated circuit chip, such an increase in capacitance value also shifts the upper break frequency of the amplifier pass band downward thereby again acting to narrow the bandwidth of the passband of the amplifier transfer characteristic at the upper end thereof even though acting to widen that bandwidth by shifting downward the lower break frequency. This downward shift of the upper break frequency occurs because this break frequency is determined by two parasitic parameters, the first being the lead inductance, $L_{mr-1}$, unavoidably present in the interconnection lead from magnetoresistive sensor $R_{mr-1}$ to the monolithic integrated circuit chip. The other parasitic component is the capacitance to ground at the base of differential amplifier input transistor $Q_{2-1}$ of which a part is due to the base-emitter and base-substrate capacitances of that transistor. However, that part is dominated by the parasitic capacitance, $C_{c_{2-1}}$, from the capacitance structure for capacitor $C_{2-1}$ to the substrate, the value of this parasitic capacitance being proportional to the area taken up the monolithic integrated circuit chip by that capacitor.

The upper break frequency of the transfer function for the amplifier is found to exhibit a peak at the break frequency point followed by a rapid increase in the signal attenuation with increasing frequency. This upper break frequency, $f_u$, is proportional to $$½\pi\sqrt{L_{mr-1}C_{c_{2-1}}}$$

where $L_{mr-1}$ is typically around 30 nH and $C_{C_{2-1}}$ is typically around 16pF.

Hence, once the passband range to accommodate the range of frequencies in the signals generated by magnetoresistive sensor $R_{mr-1}$ is set, and the arm on which the magnetoresistive sensor is positioned has been fixed in design, the capacitance value of coupling capacitor $C_{2-1}$ and the magnitude of the quiescent collector current to be drawn through differential amplifier input transistors $Q_{2-1}$ and $Q_{3-1}$ will be relatively narrowly restricted. Typical values for the lower and upper amplifier signal transfer characteristic passband break frequencies for signals from magnetoresistive sensor $R_{mr-1}$ are a lower break frequency of around 1.0 MHz and a upper break frequency of around 230 MHz. As a result, a capacitance value for coupling capacitor $C_{2-1}$ might be 250pF and the current drawn by current sink $I_2$ might be 8.0 mA. Such choices will result in a noise value for amplifier in the middle portions of the passband (20 to 120MHz) that is typically less than $0.6$ nV $/\sqrt{Hz}$.

This means that the unavoidable thermal noise generated in magnetoresistive sensor $R_{mr-1}$ dominates the noise in the circuit as this noise value for a 30 ohm nominal sensor resistor is $0.7$nV $/\sqrt{Hz}$.

The use of a cascode configuration differential amplifier for signals coupled to its input at the base of transistor $Q_{2-1}$ is to increase the bandwidth of that amplifier from that input to the differential output thereof provided between output terminal 14 and output terminal 15. The use of transistors $Q_5$ and $Q_6$ as common-base transistors in forming the cascode arrangement results in the loads at the collectors of differential amplifier input transistors $Q_{2-1}$ and $Q_{3-1}$ being only the effective emitter resistances of transistors $Q_5$ and $Q_6$. Such low value resistances very considerably reduce the effect of the collector-to-base capacitances in each of differential amplifier input transistors $Q_{2-1}$ and $Q_{3-1}$ to thereby extend their upper cutoff frequencies, all without affecting the midband gain of the amplifier. Transistors $Q_5$ and $Q_6$ operating as common-base stages to thereby avoid the effects of the collector-to-base capacitances therein so as to not limit the improved high frequency response of the amplifier achieved in the differential amplifier input transistors.

Differential amplifier input transistors $Q_{2-1}$ and $Q_{3-1}$ could be replaced by n-channel metal-oxide-semiconductor field-effect transistors to give a higher input impedance so that a smaller capacitance value would be needed for coupling capacitor $C_{2-1}$ in achieving the same passband lower break frequency in the amplifier transfer characteristic. However, this substitution will increase the power dissipated in the circuit as well as increase the noise therein. If such a substitution is made, the other bipolar transistors in the circuit can also have field-effect transistors substituted therefor if desired.

Although the present invention has been described with reference to preferred embodiments, workers skilled in the art will recognize that changes may be made in form and detail without departing from the spirit and scope of the invention.

What is claimed is:

1. A magnetoresistive sensor and preamplifier system for sensing magnetization patterns in magnetic media in a magnetic disk based digital data storage and retrieval memory, said system comprising:

a magnetoresistive sensor having one side thereof electrically connected to a reference voltage potential terminal means suited for connection to an electrical energization source;

an operating current generator having an output electrically connected to an opposite side of said magnetoresistive sensor for providing an operating current therethrough;

an amplifier formed in a monolithic integrated circuit having, an input and an output free of interconnections directly therebetween outside said amplifier; and a coupling capacitor formed as a structure in said monolithic integrated circuit electrically connected between said amplifier input and that side of said magnetoresistive sensor electrically connected to said operating current generator output where said structure of said coupling capacitor including its associated parasitic capacitance results in circuit parameters affecting values of both a lower break frequency and a higher break frequency of a frequency passband for signals generated by said magnetoresistive sensor determined at said amplifier output.

2. A magnetoresistive sensor and preamplifier system for sensing magnetization patterns in magnetic media in a magnetic disk based digital data storage and retrieval memory, said system comprising:

a magnetoresistive sensor having one side thereof electrically connected to a reference voltage potential terminal means suited for connection to an electrical energization source;

an operating current generator formed in a monolithic integrated circuit and comprising a follower device having first and second terminating regions and a control region by which, said follower device is capable of being directed to provide a conductive path between said follower device first and second terminating regions of a selected conductivity, said follower device control region begin electrically connected to a current source and said follower device second terminating region as an output thereof being electrically connected to an opposite side of said magnetoresistive sensor for providing an operating current therethrough with said magnetoresistive sensor being located remotely from said integrated circuit;

an amplifier formed in said monolithic integrated circuit having an input and an output; and a coupling capacitor formed as a structure in said monolithic integrated circuit electrically connected between said amplifier input and that side of said magnetoresistive sensor electrically connected to said operating current generator output where said structure of said coupling capacitor results in circuit parameters affecting values of both a lower break frequency and a higher break frequency of a frequency passband for signals generated by said magnetoresistive sensor determined at said amplifier output.

3. A magnetoresistive sensor and preamplifier system for sensing magnetization patterns in magnetic media in a magnetic disk based digital data storage and retrieval memory, said system comprising:

a magnetoresistive sensor having one side thereof electrically connected to a reference voltage potential terminal means suited for connection to an electrical energization source;

an operating current generator having an output electrically connected to an opposite side of said magnetoresistive sensor for providing an operating current therethrough;

an amplifier formed in said monolithic integrated circuit as a differential amplifier having an output and having one input thereof serving as an amplifier input and having another input thereof electrically connected to a shunting capacitor; and a coupling capacitor formed as a structure in said monolithic integrated circuit electrically connected between said amplifier input and that side of said magnetoresistive sensor electrically connected to said operating current generator output where said structure of said coupling capacitor results in circuit parameters affecting values of both a lower break frequency and a higher break frequency of a frequency passband for signals generated by said magnetoresistive sensor determined at said amplifier output, and with said shunting capacitor being formed in said monolithic integrated circuit with a structure substantially matched to that of said coupling capacitor.

4. The system of claim 2 wherein said follower device control region is also connected to a reference voltage determiner which draws current from said current source.

5. The system of claim 3 wherein said differential amplifier is a cascode configuration differential amplifier.

6. A magnetoresistive sensor and preamplifier system for sensing magnetization patterns In a magnetic disk based digital data storage and retrieval memory, said system comprising:

a magnetoresistive sensor having one side thereof electrically connected to a reference voltage potential terminal means suited for connection to an electrical energization source;

an operating current generator comprising a current source in series with a resistive means and further comprising a follower device having first and second terminating regions and a control region by which said follower device is capable of being directed to provide a conductive path between said follower device first and second terminating regions of a selected conductivity, said follower device control region being electrically connected to said current source and said follower device second terminating region being electrically connected to said magnetoresistive sensor;

a differential amplifier having a pair of inputs and a current summation output electrically connected to a current sink; and a coupling capacitor electrically connected between one of said pair of said differential amplifier inputs and said magnetoresistive sensor, and a shunting capacitor electrically connected between said remaining one of said differential amplifier inputs and said voltage reference terminal means.

7. The system of claim 6 wherein said current sink is electrically between said differential amplifier current summation output and said voltage reference terminal means.

8. The system of claim 6 wherein said differential amplifier is a cascode configuration differential amplifier.

9. The system of claim 6 wherein said magnetoresistive sensor is remote from said monolithic integrated circuit but electrically interconnected therewith.

10. The system of claim 1 wherein said magnetoresistive sensor is a first magnetoresistive sensor in a plurality thereof each having one side thereof electrically connected to said reference voltage potential terminal means; and wherein said operating current generator is a first operating current generator in a plurality thereof having said output thereof electrically connected to an opposite side of said first magnetoresistive sensor with those other said operating current generators in said plurality thereof each having an output that is electrically connectable to an opposite side of a corresponding one of said magnetoresistive sensors in said plurality thereof; and further wherein said amplifier is a first amplifier in a plurality thereof each formed in said monolithic integrated circuit and having an input and an output; and yet further wherein said coupling capacitor is a first coupling capacitor in a plurality thereof that is electrically connected between said first amplifier input and that side of said first magnetoresistive sensor electrically connected to said first operating current generator output with those other said coupling capacitors in said plurality thereof each formed as a structure in said monolithic integrated circuit and each electrically connected between a said input of a corresponding one of said plurality of amplifiers and that side of a corresponding one of said magnetoresistive sensors in said plurality thereof that is electrically connectable to an output of a corresponding one of said operating current generators in said plurality thereof, said structure of each of said plurality of coupling capacitors resulting in circuit parameters affecting values of both a lower break frequency and a higher break frequency of a frequency passband for signals generated by that corresponding one of said magnetoresistive sensors as determined at said output of its corresponding said amplifier in said plurality thereof.

11. The system of claim 2 wherein said magnetoresistive sensor is a first magnetoresistive sensor in a plurality thereof each of which is remote from said monolithic integrated circuit but electrically interconnected therewith so as to be electrically connected to said reference voltage potential terminal means; and wherein said operating current generator is a first operating current generator in a plurality thereof having said output thereof electrically connected to an opposite side of said first magnetoresistive sensor with those other said operating current generators in said plurality thereof each having an output that is electrically connectable to an opposite side of a corresponding one of said magnetoresistive sensors in said plurality thereof as an alternative to having said first operating current generator electrically connected to an opposite side of said first magnetoresistive sensor, said plurality of operating current generators each comprising a follower device having first and second terminating regions and a control region by which said follower device is capable of being directed to provide a conductive path between said follower device first and second terminating regions of a selected conductivity with said control region thereof being electrically connected to said current source and said second terminating region thereof being electrically connected to a corresponding one of said plurality of magnetoresistive sensors.

12. The system of claim 3 where each of said plurality of amplifiers is a differential amplifier having one input thereof serving as said amplifier input electrically interconnected to a corresponding one of said plurality of coupling capacitors and having another input thereof electrically connected to said shunting capacitor formed in said monolithic integrated circuit with a structure substantially matched to that of each of said coupling capacitors.

13. The system of claim 2 wherein said amplifier input and output are free of interconnections directly therebetween outside said amplifier and said coupling capacitor has a parasitic capacitance associated therewith.

14. The system of claim 3 wherein said amplifier input and output are free of interconnections directly therebetween outside said amplifier and said coupling capacitor has a parasitic capacitance associated therewith.

* * * * *